United States Patent
Bakshi et al.

(10) Patent No.: US 8,261,730 B2
(45) Date of Patent: *Sep. 11, 2012

(54) IN-SITU WAFER PROCESSING SYSTEM AND METHOD

(75) Inventors: Abhaya Kumar Bakshi, Westford, MA (US); Bhaskar Chandra Panigrahi, Southborough, MA (US)

(73) Assignee: Cambridge Energy Resources Inc, Cambridge, MA (US)

( * ) Notice: Subject to any disclaimer, the term of this patent is extended or adjusted under 35 U.S.C. 154(b) by 684 days.

This patent is subject to a terminal disclaimer.

(21) Appl. No.: 12/360,858

(22) Filed: Jan. 28, 2009

(65) Prior Publication Data

US 2010/0126489 A1 May 27, 2010

Related U.S. Application Data

(60) Provisional application No. 61/117,609, filed on Nov. 25, 2008.

(51) Int. Cl.
*B28D 1/06* (2006.01)

(52) U.S. Cl. ............... 125/16.02; 125/16.01; 125/21; 125/35; 125/13.01; 451/53

(58) Field of Classification Search ............ 125/16.02, 125/16.01, 21, 35, 13.01; 451/53, 449, 299, 451/73; 216/83, 96, 99–101, 106–109; 134/104.2, 134/186

See application file for complete search history.

(56) References Cited

U.S. PATENT DOCUMENTS

| | | | | |
|---|---|---|---|---|
| 2,851,764 | A * | 9/1958 | White | 407/11 |
| 2,967,381 | A * | 1/1961 | Brown | 451/320 |
| 3,081,586 | A * | 3/1963 | Gersbach | 451/41 |
| 3,128,213 | A * | 4/1964 | Moross et al. | 438/460 |
| 3,493,475 | A * | 2/1970 | Rairden et al. | 205/188 |
| 3,540,427 | A * | 11/1970 | Anderson | 125/21 |
| 4,227,348 | A * | 10/1980 | Demers | 451/41 |
| 4,228,782 | A * | 10/1980 | Demers et al. | 125/14 |
| 4,276,114 | A * | 6/1981 | Takano et al. | 438/471 |
| 4,343,662 | A * | 8/1982 | Gay | 438/460 |
| 4,909,863 | A * | 3/1990 | Birkmire et al. | 148/33.4 |
| 5,304,261 | A * | 4/1994 | Yamamoto et al. | 148/519 |
| 5,771,876 | A * | 6/1998 | Egglhuber | 125/21 |
| 5,849,636 | A * | 12/1998 | Harada et al. | 438/691 |
| 5,855,735 | A * | 1/1999 | Takada et al. | 438/691 |
| 5,890,481 | A * | 4/1999 | Bigelow | 125/16.02 |
| 5,922,137 | A * | 7/1999 | Fukunaga et al. | 134/2 |
| 5,944,007 | A * | 8/1999 | Miyoshi et al. | 125/13.01 |

(Continued)

*Primary Examiner* — George Nguyen
(74) *Attorney, Agent, or Firm* — Prakash Nama; Global IP Services, PLLC

(57) ABSTRACT

An integrated wafer processing system and a method thereof is disclosed. In one embodiment, a wafer stack of sliced wafers includes a base, and a plurality of sliced wafers extending outwardly from the base, where the plurality of sliced wafers are obtained by slicing a portion of a work piece, where the base is an uncut portion which is the remaining portion of the work piece or a plate attached by welding to the plurality of sliced wafers and where the work piece is monocrystalline or multi-crystalline silicon. Further, the wafer stack of sliced wafers are treated in-situ in cleaning and wet chemical tanks for processes such as damage etching, texturization and oxide etching and also treated in-situ in high temperature furnaces for processes such as diffusion and anti-reflection coating.

30 Claims, 10 Drawing Sheets

U.S. PATENT DOCUMENTS

| | | | | |
|---|---|---|---|---|
| 5,950,643 | A * | 9/1999 | Miyazaki et al. | 134/25.4 |
| 6,018,884 | A * | 2/2000 | Fukunaga et al. | 34/107 |
| 6,037,270 | A * | 3/2000 | Kageyama et al. | 438/746 |
| 6,056,031 | A * | 5/2000 | Banzawa et al. | 156/378 |
| 6,113,489 | A * | 9/2000 | Nishi et al. | 451/262 |
| 6,182,729 | B1 * | 2/2001 | Banzawa et al. | 156/353 |
| 6,328,027 | B1 * | 12/2001 | Persyk et al. | 125/21 |
| 6,390,889 | B1 * | 5/2002 | McGregor et al. | 451/41 |
| 6,463,920 | B1 * | 10/2002 | Kondo et al. | 125/15 |
| 6,543,434 | B2 * | 4/2003 | Holzmuller et al. | 125/21 |
| 6,652,356 | B1 * | 11/2003 | Ariga | 451/7 |
| 6,699,401 | B1 * | 3/2004 | Horiuchi et al. | 216/108 |
| 6,920,871 | B2 * | 7/2005 | Bieri | 125/16.02 |
| 6,941,940 | B1 * | 9/2005 | Zavattari et al. | 125/16.02 |
| 7,025,054 | B2 * | 4/2006 | Kondo et al. | 125/21 |
| 7,025,665 | B2 * | 4/2006 | Bender | 451/296 |
| 7,306,508 | B2 * | 12/2007 | Kawasaki et al. | 451/7 |
| 7,503,831 | B2 * | 3/2009 | Radkevich et al. | 451/8 |
| 7,582,221 | B2 * | 9/2009 | Netsu et al. | 216/88 |
| 7,629,257 | B2 * | 12/2009 | Klein et al. | 438/689 |
| 7,637,801 | B2 * | 12/2009 | Kajimoto et al. | 451/41 |
| 7,878,883 | B2 * | 2/2011 | Gupta et al. | 451/7 |
| 2002/0016072 | A1 * | 2/2002 | Hashii et al. | 438/690 |
| 2002/0115390 | A1 * | 8/2002 | Kondo et al. | 451/49 |
| 2002/0174861 | A1 * | 11/2002 | Lundt et al. | 125/21 |
| 2004/0084042 | A1 * | 5/2004 | McAulay et al. | 125/21 |
| 2006/0011588 | A1 * | 1/2006 | Stinson et al. | 216/99 |
| 2006/0124590 | A1 * | 6/2006 | Nakashima et al. | 216/83 |
| 2006/0154575 | A1 * | 7/2006 | Kajimoto et al. | 451/41 |
| 2007/0151944 | A1 * | 7/2007 | Du | 216/24 |
| 2007/0267387 | A1 * | 11/2007 | Koyata et al. | 216/88 |
| 2008/0295860 | A1 * | 12/2008 | Burger | 134/1 |
| 2009/0078305 | A1 * | 3/2009 | Nishiwaki | 136/249 |
| 2009/0223539 | A1 * | 9/2009 | Gibbel | 134/2 |
| 2009/0246969 | A1 * | 10/2009 | Fath et al. | 438/753 |
| 2010/0126489 | A1 * | 5/2010 | Bakshi et al. | 125/16.02 |
| 2010/0126490 | A1 * | 5/2010 | Bakshi et al. | 125/21 |

* cited by examiner

IN-SITU WAFER PROCESSING SYSTEM AND METHOD

RELATED APPLICATIONS

This application claims priority under 35 U.S.C. 119 to U.S. Provisional Application No. 61/117,609, entitled "INTEGRATED WAFER PROCESSING SYSTEM" by Cambridge Energy Resources, Inc., filed on Nov. 25, 2008, which is incorporated herein its entirety by reference.

FIELD OF TECHNOLOGY

The present invention relates generally to wafers and more particularly relates to system and method of manufacture of wafers and cells for photovoltaic applications.

BACKGROUND

Typically, manufacture of wafers and solar cells, include processes, such as slicing, cleaning, damage etching, texturization, diffusion, oxide etching, anti-reflection coating, metallization and so on. The slicing process is generally the first step in any solar cell manufacturing line. Wire saws are extensively used to slice crystalline silicon blocks to produce wafers.

Besides slicing silicon, the wire saws are also used for slicing a variety of other materials including sapphire, gallium arsenide (GaAs), indium phosphide (InP), silicon carbide (SiC), glass, lithium tantalate ($LiTaO_3$) Z-cut crystals, lithium niobate ($LiNbO_3$), lithium triborate ($LiB_3O_5$), quartz crystals, ceramics like aluminum nitride (ALN) and lead zirconate titanate (PZT), magnetic materials/parts, optical parts and the like material.

The wire saws typically use a 120-180 micron diameter steel wire, which is several hundred kilometers long (FIG. 1). The wire is wound around a supply spool 110, a set of rollers called "wire guides" 130 to make a bed of parallel moving wire, often called "wire web" 140, and a take-up spool 120 as shown in FIG. 1. The wire guides 130 have equally spaced grooves on their outer surface to control spacing between the wires as it goes around the wire guides 130. The distance between the grooves, called pitch, eventually decides thickness of the wafers.

During the manufacture of wafers, the work piece or the ingot 150, which needs to be sliced, is first glued to a plate 160 and then mounted on the wire saw. Then the ingot 150 is pressed with a vertical motion (top to bottom or bottom to top) against the horizontally moving wire web 140 in a wire saw to slice wafers which still adhere to the plate 160 after the sawing process. During the sawing process, the wire travels at a speed of about 10-15 meters/sec (or even higher) during slicing of wafers. Abrasive slurry, mainly made up of silicon carbide grains and a lubricant (e.g., polyethylene glycol or mineral oil), is introduced over the wire web 140. The abrasive slurry 210 coats the wire and travels to the cutting zone as shown in FIG. 2. Typically, slicing is achieved by slowly pushing the ingot 150 against the wire web 140. Furthermore, as cutting progresses, very fine silicon particles are loaded into the slurry. These particles in the slurry can increasingly adhere to the wafer surface as a function of time during the process. This is particularly true for very thin wafers, which require a much longer time to cut.

In addition, the current wire saws generate heat during slicing. Also, as the wafers become thinner, the cutting surface area increases significantly and as a result this can significantly increase the amount of heat generated during slicing. Further, the current wire saws cannot dissipate such heat generated during slicing. Furthermore, lesser area is generally available for heat dissipation by radiation during slicing due to the slurry getting loaded between the wafers. This can lead to significant thermal stress in the wafers. Furthermore, the heat generated during slicing can soften the glue holding the stack of wafers to the plate 160. This can result in wafers dislodging from the plate 160 and breaking during slicing.

Although the aforementioned conventional wire saws are widely used for slicing brittle materials such as silicon, they also impose a series of high stress operating conditions during slicing. Typically, the mechanical stresses are due to pressure and vibration on the wire as well as hydro-dynamic stresses originating from the slurry. The wafers must withstand these forces during operation otherwise they will break. This may pose serious challenge to the solar industry to slice thinner wafers. As the silicon wafers are manufactured to thinner specification, the sensitivity of each wafer to any stress is increased and wafers readily break.

Currently, the standard for the solar industry is wafers sliced to a thickness of about 200 micrometers (microns; μm). An industry road map calls for reducing this thickness to 100 micron in the next 2-3 years. New processes to reduce mechanical and hydro-dynamic stresses during wafering and subsequent handling steps must be found to achieve this target. In summary, the mechanical, thermal and hydrodynamic stresses induced during the above slicing process can result in significant breakage of silicon wafers and thereby increasing the cost of manufacturing silicon wafers. Further, as the silicon wafers are manufactured to thinner specifications, the sensitivity of these thinner wafers to any stress is significantly increased and these wafers can readily break.

In the wire saw, slicing is completed when the ingot 150 completely passes through the wire web 140 in the wire saw. At this point, the wafer stack which is held to the plate 160 is slowly pulled out of the wire web 140. After completing slicing and removing the stack of wafers from the wire saw the wafers are then cleaned immediately with water and other solvents to remove the abrasive slurry 210, otherwise the abrasive slurry 210 may stain the wafers thereby making them unusable in downstream processes. Further, the slurry remaining between the wafers needs to be removed quickly otherwise the slurry between the wafer can harden and hold the wafers together tightly and can make it difficult to remove the wafers from the plate 160 and in some instances can break the wafers.

Furthermore, removing the wafers from the plate 160 is generally a very labor intensive task as the glue which holds the wafers to the plate 160 is softened by heating and also that the wafers are removed individually (mostly manually). Furthermore, the process requires rearranging of the sliced wafers after the sawing by manually detaching each wafer from the plate 160 and loading them into plastic wafer carriers or cassettes before cleaning. This can be a tremendous amount of manual task. Moreover, this labor intensive task can lead to certain amount of breakage of sliced wafers during manual handling. In a solar manufacturing line, these plastic wafer carriers including the wafers are passed through a series of cleaning and etching tanks containing water and chemicals to remove dirt and damaged layers from the wafer surfaces.

Finally, these plastic wafer carriers including the wafers are immersed in an appropriate chemical to texturize the wafer surface to increase sunlight absorption. The texturized wafers are then dried and transferred from plastic wafer carriers to ceramic or quartz wafer carriers for high temperature treatment (up to 1500° C.) in diffusion furnaces. It can be seen that the above solar manufacturing process is very labor intensive and slow. Also, it can be seen that the above described solar manufacturing process may require a significant amount of equipments.

In addition, in above described current conventional downstream processes that follows the slicing and cleaning steps, the wafers are handled individually, where the wafers are picked, turned, rinsed, dried, flipped, carried and stacked several times before they are transformed into solar cells. All these steps can be very time consuming and can carry tremendous risk of wafer breakage. Generally, in the cleaning and etching processes, wafers are placed in plastic carriers/holders and dipped in a solution. These wafer carriers are typically designed to hold about 25-200 wafers. The number of wafers that can be held in each carrier/holder is typically limited by the gap needed to be maintained between wafers in the carrier/holder. It can be seen that a typical solar cell manufacturing line can require a significantly large number of wafer carriers to keep the process running without any interruption.

Typically, in the manufacture of wafers and cells for photovoltaic applications, thousands of wafers are processed per hour, which necessitates installing a large number of chemical stations to achieve a desired throughput. Thus, increasing the number of wafers per carrier/holder can significantly increase wafer throughput. Further, during the chemical etching process, thin wafers tend to float to the top surface of the etching solution, thereby resulting in not completely treating the wafers.

Furthermore, during diffusion and coating processes, the gases are blown over the thin wafers. The force generated by the blown gases can dislodge the wafers from the wafer carrier affecting productivity. Moreover, the above problems can become very acute when wafer thicknesses are reduced to 100 um (micrometer) or thinner. It can be seen that as the wafers and the subsequent solar cells become thinner, using the above described conventional process can significantly increase the breakage rate of wafers. This can result in increased cost for producing solar cells.

SUMMARY

An in-situ wafer processing system and a method thereof is disclosed. According to one aspect of the present invention, a wafer stack of sliced wafers includes a base, and a plurality of sliced wafers extending outwardly from the base, where the plurality of sliced wafers are obtained by slicing a portion of a work piece, where the base is an uncut portion which is the remaining portion of the work piece, and in which the work piece is mono-crystalline or multi-crystalline silicon.

According to another aspect of the present invention, a wafer stack of sliced wafers includes a base, and a plurality of sliced wafers extending outwardly from the base, where the plurality of sliced wafers are obtained by slicing a portion of a work piece, where the base is attached by welding to the plurality of sliced wafers, in which the work piece is mono-crystalline or multi-crystalline silicon, and in which the plate is glass, ceramic, plastic, silicon or a like material.

According to yet another aspect of the present invention, an integrated wafer processing system includes a wire sawing apparatus, where the wire sawing apparatus includes a wire web, and at least one outlet for applying fluid (e.g., an abrasive slurry) during sawing, and where at least one work piece is impelled against the wire web, such that the fluid is applied to the at least one work piece and the fluid flows into the at least one work piece for slicing and resulting in wafer stack of cut wafers held integrally by an uncut portion or by a welded plate.

The integrated wafer processing system also includes means for damage etching of the wafers in-situ in the wafer stack (e.g., using etchants such as hot potassium hydroxide (KOH), sodium hydroxide (NaOH) solution, etc.), after slicing is substantially complete or while the wafers are in the wire sawing apparatus. Further, the integrated wafer processing system includes means for texturization of the wafers in the wafer stack (e.g., using chemical solutions, such as potassium hydroxide (KOH), hydrofluoric acid (HF) and nitric acid ($HNO_3$), etc.), after damage etching is substantially complete.

In addition, the integrated wafer processing system includes means for treating of the wafers in the wafer stack with heat processes such as diffusion and anti-reflection coating. Following the diffusion process, the wafers can be further treated in-situ to remove the oxide layer by etching with chemicals such as hydrofluoric acid (HF). For example, the integrated wafer processing system also includes means for oxide etching of the wafers in the wafer stack after the diffusion is substantially complete.

According to a further aspect of the present invention, a method for producing wafers includes cutting a work piece including at least one ingot by impelling the work piece into a wire web, such that the work piece is moved into the wire web, and contacting the moving work piece for slicing thin wafers with fluid (e.g., an abrasive slurry) resulting in a thin wafer stack, wherein the fluid flows under at least a gravitational force such that the moving the work piece and contacting with the fluid results in slicing the thin wafers secured at one end to a plate.

The method also includes, during cleaning, dissipating heat by adjusting slicing rate and thermal properties of the abrasive slurry and the cleaning fluid. Further, the method includes during or after cleaning, performing at least one of damage etching, texturizing, diffusion, oxide etching, and/or applying anti-reflection coating to the thin wafers of the wafer stack.

The methods and apparatuses disclosed herein may be implemented in any means for achieving various aspects. Other features will be apparent from the accompanying drawings and from the detailed description that follows.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

An integrated wafer processing system and a method thereof is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "slicing", "sawing", "watering", and "cutting" are used interchangeably throughout the document. Also, the terms "sliced wafers" and "cut wafers" means the same. Further, the terms "integrated wafer processing system" and "in-situ wafer processing system" are used interchangeably throughout the document. In the document, the term "fully cut work piece" refers to a work piece of which all the sides are cut and which is attached to a plate before loading on a wire sawing apparatus and the term "partially cut work piece" refers to a work piece in which one or more sides are retained to act as a plate for holding the work piece during wafer slicing and processing operations.

Figure 3A:
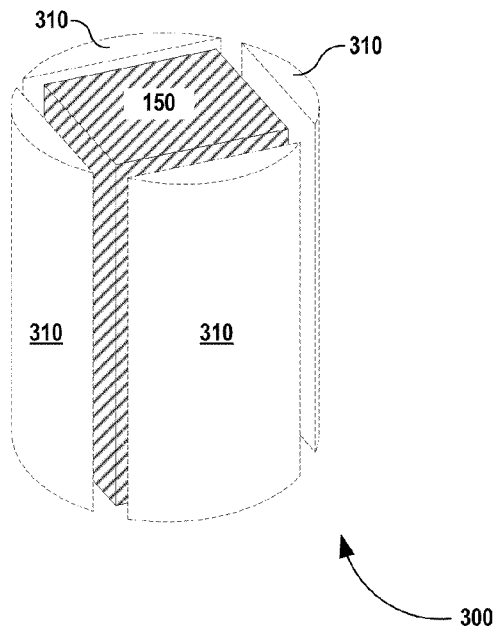
FIGS. 3A and 3B illustrate an exemplary method of mono-crystalline and multi-crystalline work piece preparation, in the context of the invention.
Figure 3B:
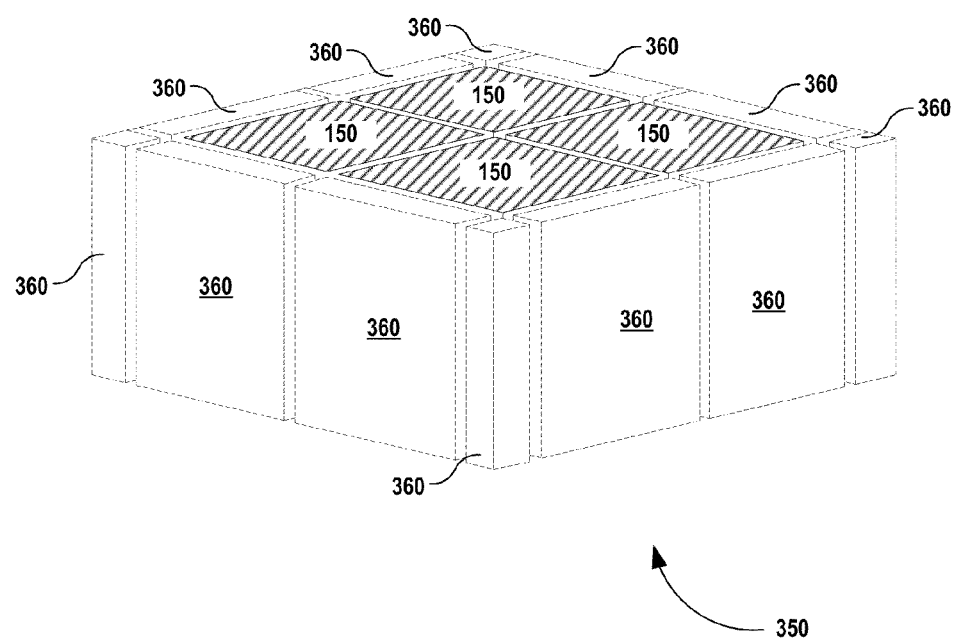
Figure 5A:
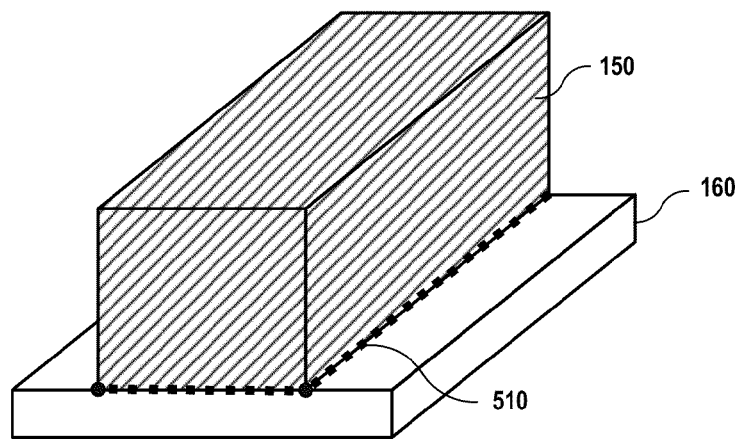
FIG. 5 illustrates exemplary methods of work piece preparation prior to loading on a wire sawing apparatus, such as those shown in FIGS. 1, 6 and 7, according to an embodiment of the present invention.

FIGS. 3A and 3B illustrate an exemplary method of mono-crystalline and multi-crystalline work piece preparation, in the context of the invention. In mono-crystalline process, an ingot is grown to a cylindrical shape. As shown in FIG. 3A, the curved portions 310 of the cylindrical ingot 300 are cut-off from the four sides to produce a square cross-section work piece 150, hereinafter referred to as a fully cut work piece. The fully cut work piece 150 is attached to a plate (e.g., as shown in FIG. 5A) prior to loading on to a wire sawing apparatus. The curved portions 310 that are cut-off from the cylindrical shaped rod 300 can be recycled and the fully cut work piece 150 is sliced in the wire sawing apparatus, such as those shown in FIGS. 1, 6 and 7.

In the multi-crystalline process, an ingot is cast in a crucible (e.g., quartz crucible). As shown in FIG. 3B, sides 360 of the multi-crystalline ingot 350 are cut-off to produce multiple fully cut work pieces 150 before sawing as they are conventionally contaminated from the crucible. These cut-off sides 360 are recycled in a furnace to make new ingot and each of the multiple fully cut work pieces 150 are loaded on the wire sawing apparatus and sliced to produce wafers.

Figure 1:
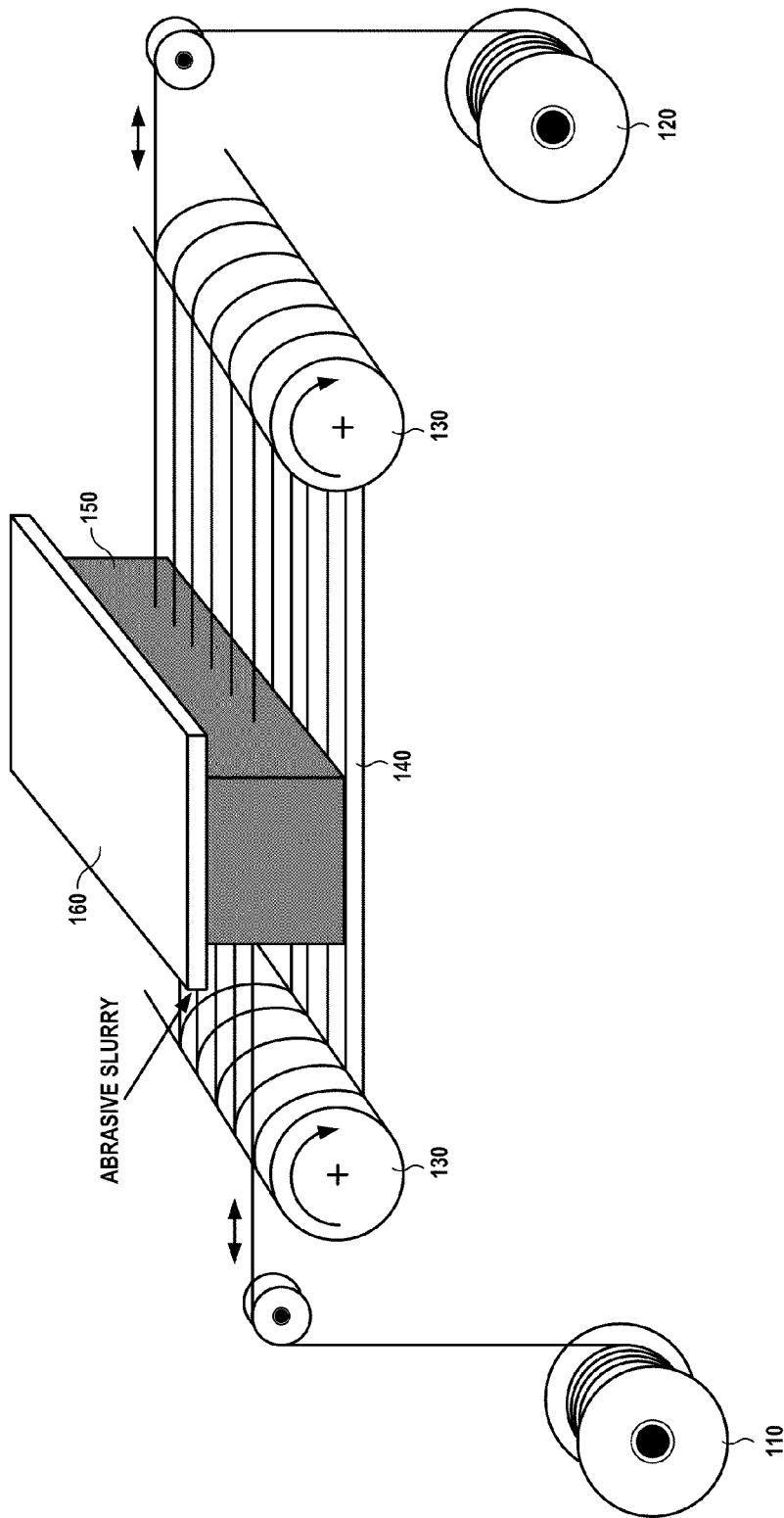
FIG. 1 illustrates schematics of a conventional wire saw.
Figure 4A:
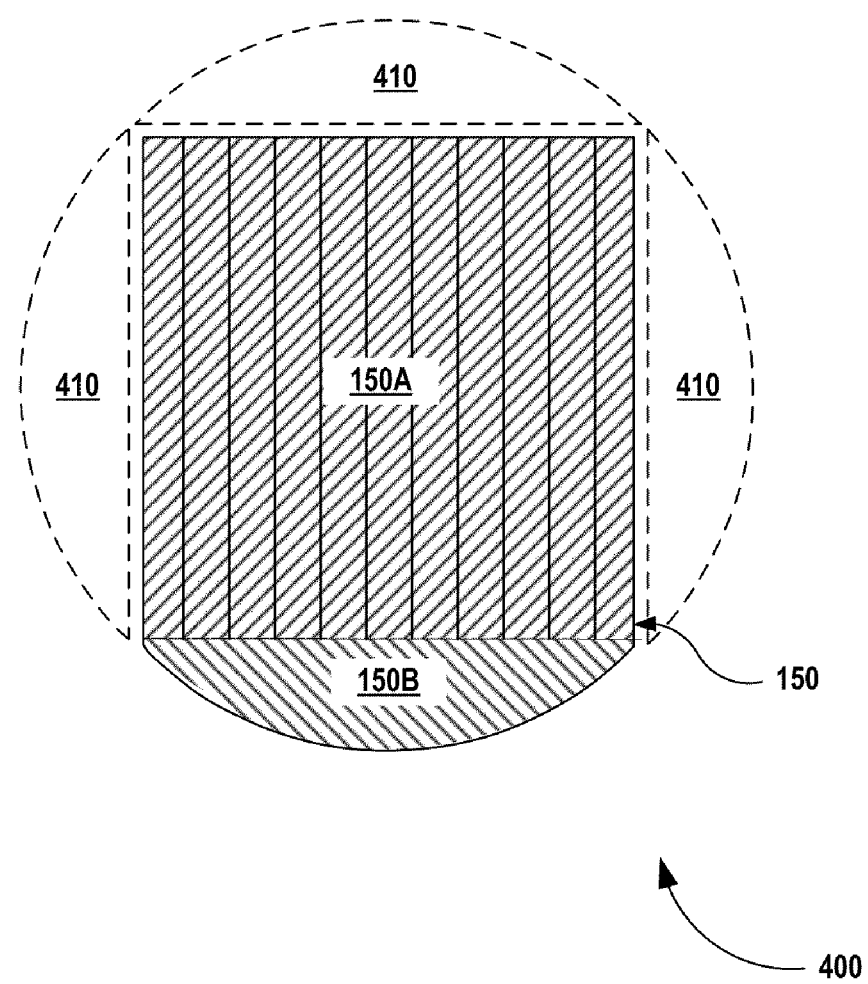
FIG. 4A illustrates an exemplary method of mono-crystalline work piece preparation prior to loading on a wire sawing apparatus, such as those shown in FIGS. 1, 6 and 7, according to an embodiment of the present invention.
Figure 6:
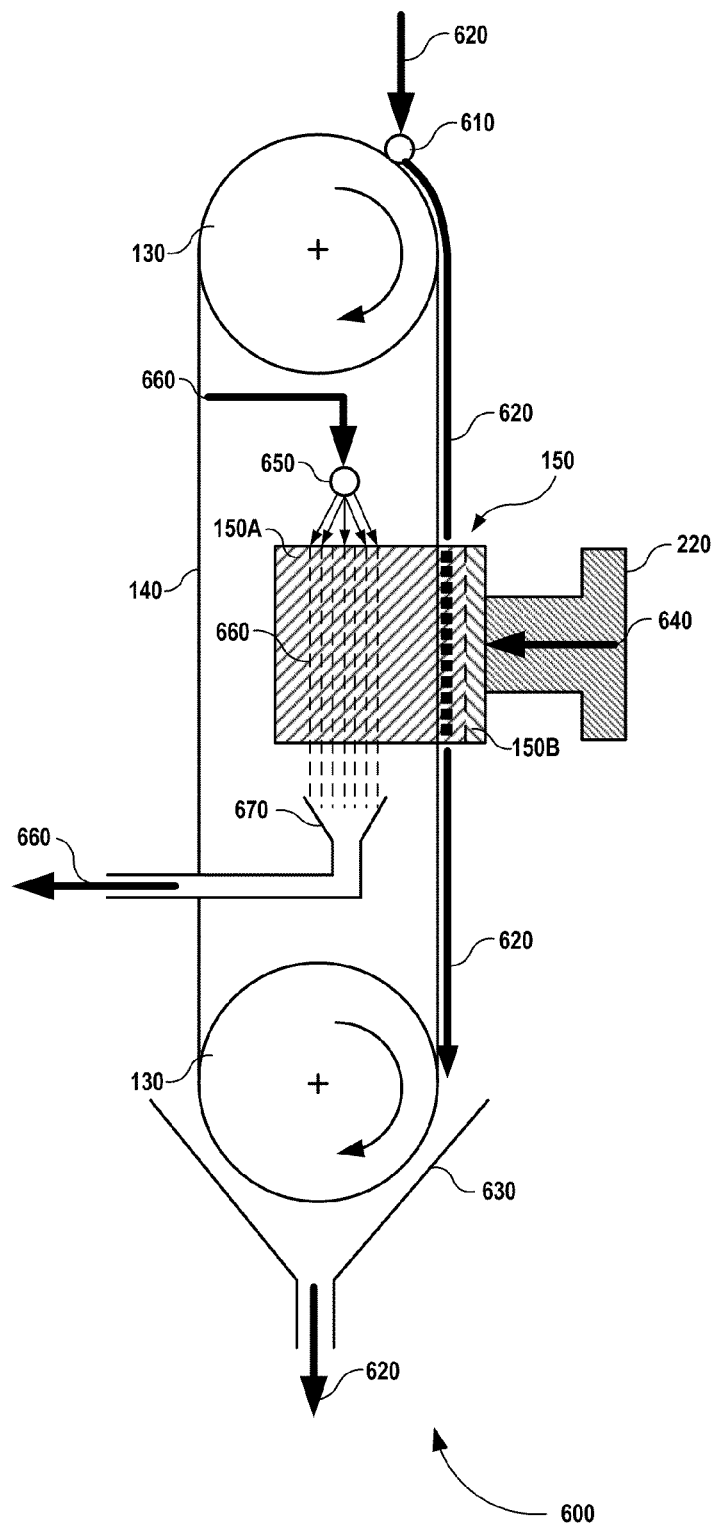
FIG. 6 illustrates an exemplary horizontal ingot feeding wire slicing and cleaning apparatus and a method thereof, according to an embodiment of the present invention.
Figure 7:
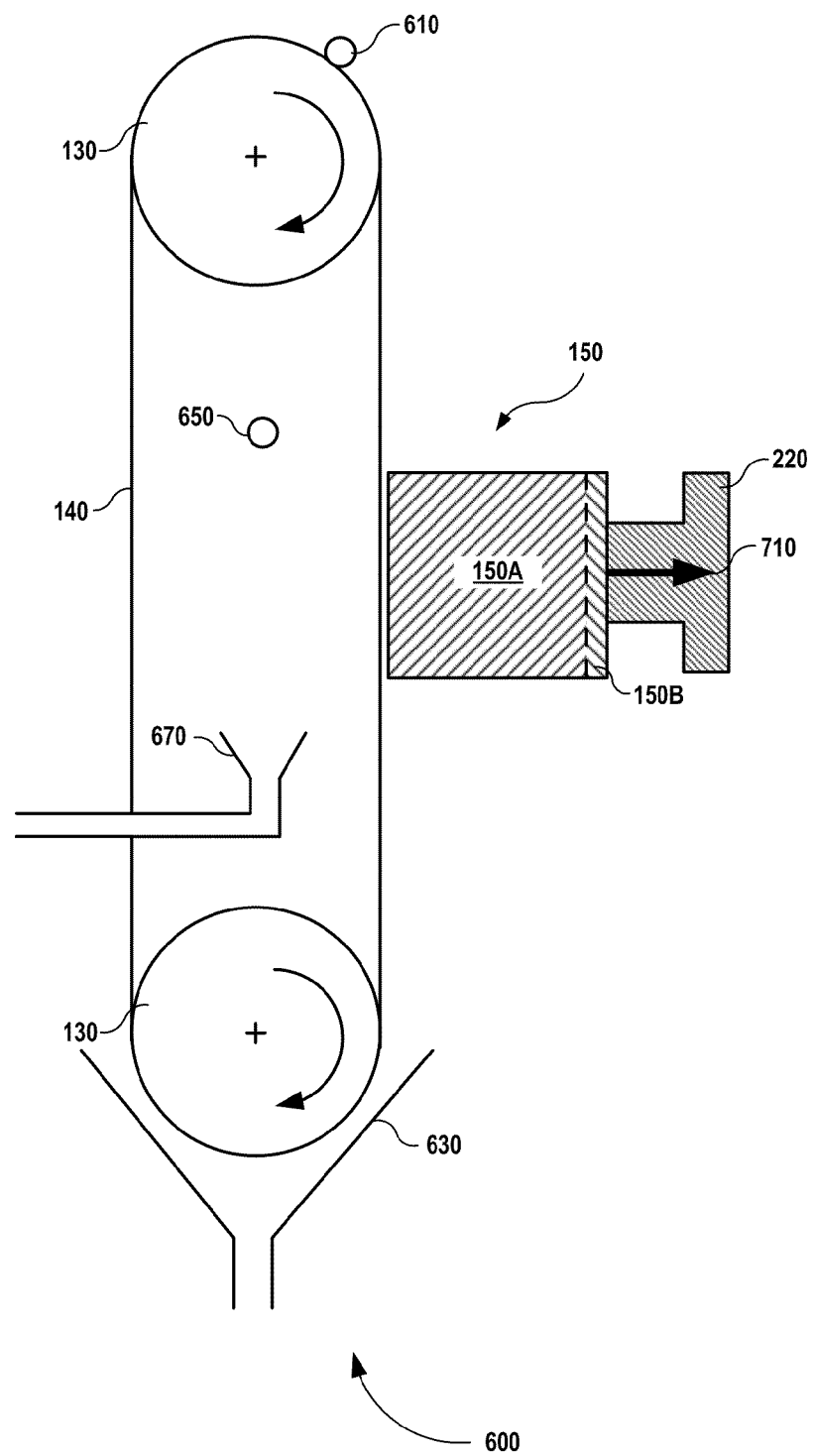
FIG. 7 illustrates the exemplary horizontal ingot feeding wire slicing and cleaning apparatus shown in FIG. 6, wherein the sliced and cleaned wafers are removed after the sawing operation, according to an embodiment of the present invention.

FIG. 4A illustrates an exemplary method of mono-crystalline work piece preparation prior to loading on a wire sawing apparatus, such as those shown in FIGS. 1, 6 and 7, according to an embodiment of the present invention. Particularly, FIG. 4A illustrates a mono-crystalline ingot of circular cross-section. As illustrated in FIG. 4A, three sides 410 of the mono-crystalline ingot 400 are cut-off and one side 150B is retained to form as a plate (e.g., of semi-circular cross section as illustrated in FIG. 4A).

Thus, the work piece 150, hereinafter referred to as a partially cut work piece 150, includes a portion to be sliced 150A and the plate 150B which is an uncut portion of the mono-crystalline ingot 400 to hold the wafers during wafer sawing and processing operations. It is appreciated that, retaining the uncut portion 150B eliminates the need for separately attaching the plate 160 to the portion to be sliced 150A by welding (e.g., as illustrated in FIG. 5A), glue or epoxy. It should be noted that, the plate 150B is cut-off and sent for recycling to produce new ingot once processing of sliced wafers is complete. Further, one can envision that more than one side of the mono-crystalline ingot 400 may be retained to act as the plate.

Figure 4B:
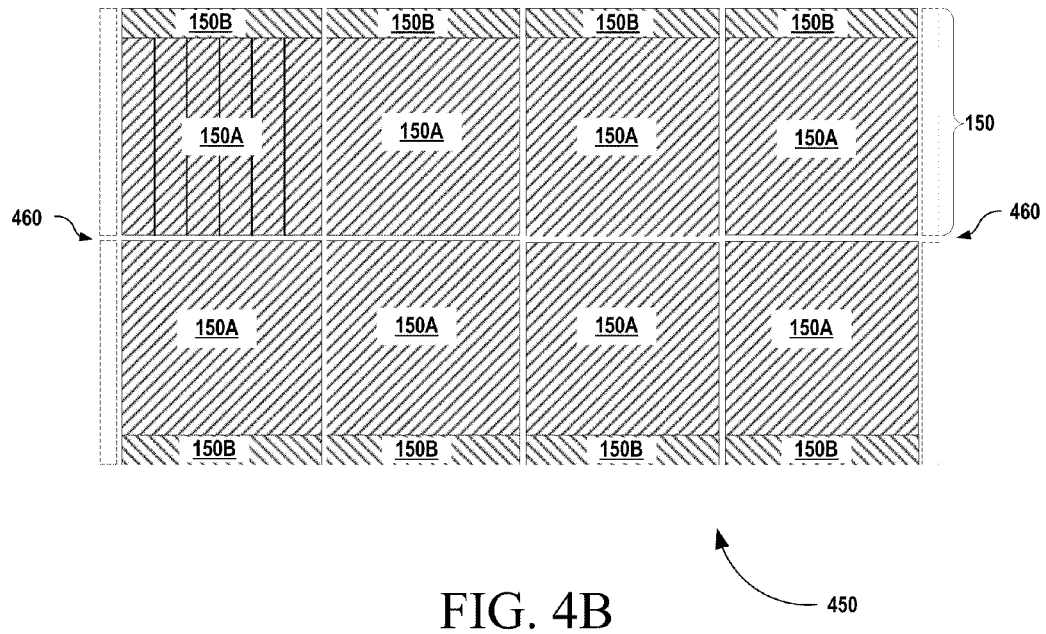
FIG. 4B illustrates an exemplary method of multi-crystalline work piece preparation prior to loading on a wire sawing apparatus, such as those in FIGS. 1, 6 and 7, according to an embodiment of the present invention.

FIG. 4B illustrates an exemplary method of multi-crystalline work piece preparation prior to loading on a wire sawing apparatus, such as those in FIGS. 1, 6 and 7, according to an embodiment of the present invention. It can be seen from FIG. 4B that, a multi-crystalline ingot 450 is cut into eight work pieces. As shown in FIG. 4B, sides 460 of the multi-crystalline ingot 450 are cut-off while sides 150B are retained to act as a plate for holding the sliced wafers during wafer sawing and processing operations. Thus, as illustrated, each partially cut work piece 150 includes a portion to be sliced 150A and the plate 150B. The sides 460 can be recycled for casting new ingots. Further, as the sides 150B which are the uncut portions of the multi-crystalline ingot 450 are retained, the need for attaching the plate 160 to the portion to be sliced 150A by welding (e.g., as shown in FIG. 5A), epoxy or glue is eliminated. After the wafers are sliced and processed, the plates 150B associated with the portion to be sliced 150A are cut-off and are recycled to cast new ingots.

Figure 4C:
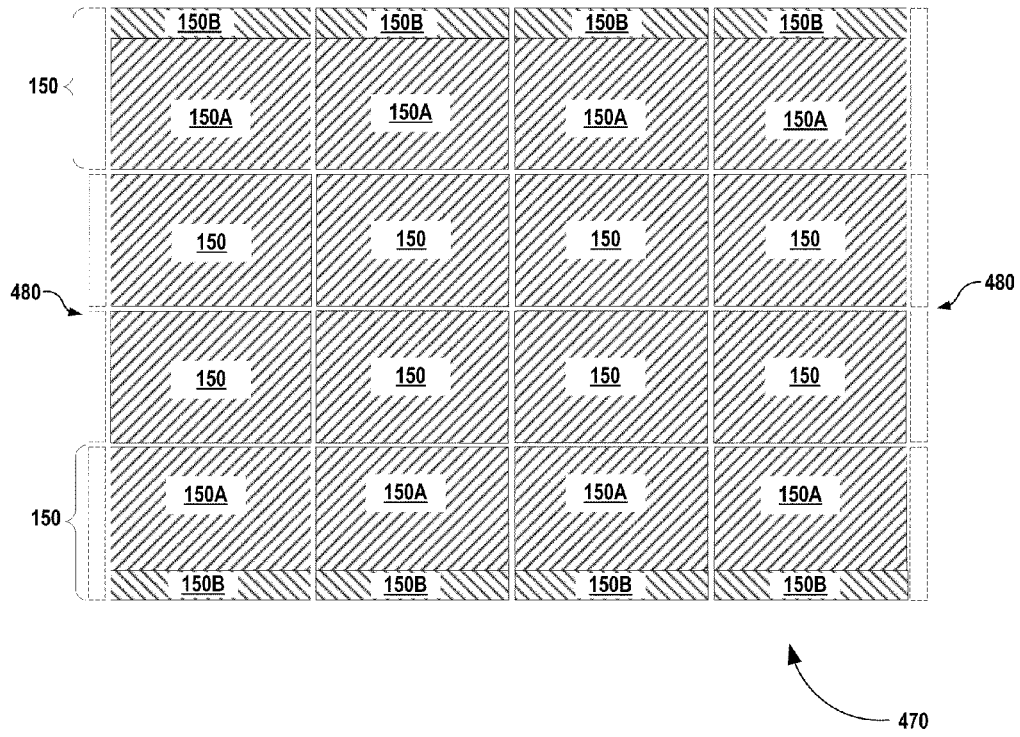
FIG. 4C illustrates another exemplary method of multi-crystalline work piece preparation, according to an embodiment of the present invention.

FIG. 4C illustrates another exemplary method of multi-crystalline work piece preparation, according to an embodiment of the present invention. It can be seen in FIG. 4C that, a multi-crystalline ingot 470 is cut into a sixteen work pieces 150. As shown in FIG. 4C, sides 480 of the multi-crystalline ingot 470 are cut-off while sides 150B are retained to act as a plate for holding the sliced wafers during wafer sawing and processing operations. Thus, the partially cut work pieces (i.e., the portions to be sliced 150A with plates 150B) and fully cut work pieces 150 are obtained from the multi-crystalline ingot 470.

The fully cut work pieces 150 are separately attached to the plate 160 by welding (e.g., as shown in FIG. 5A), epoxy, or glue for holding the fully cut work pieces 150 during the sawing and processing operations. It should be noted that, as the sides 150B, which are the uncut portions of the multi-crystalline ingot 470, are retained, the need for attaching the plate 160 to the partially cut work pieces 150 by welding, epoxy, or glue is eliminated. After the wafers are sliced and processed, the plates 150B associated with the partially cut work pieces 150 are cut-off and are recycled to cast new ingots.

Figure 5B:
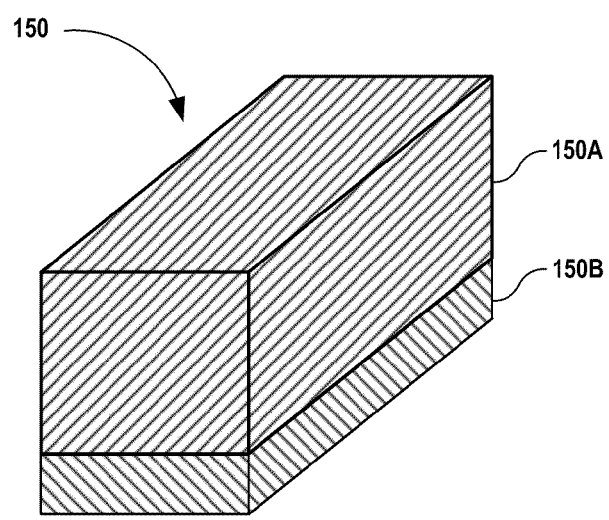

FIG. 5 illustrates exemplary methods of work piece preparation prior to loading on a wire sawing apparatus, such as those shown in FIGS. 1, 6 and 7, according to an embodiment of the present invention. Particularly, FIG. 5A and FIG. 5B show preparation of fully cut and partially cut work pieces 150, respectively. As shown in FIG. 5A, the fully cut work piece 150 (as discussed in FIGS. 3A, 3B and 4C) are attached to a plate 160 as a part of work piece preparation. The plate 160 may be glass, ceramic, plastic, silicon or a like material. In one exemplary implementation, the fully cut work piece 150 is attached to the plate 160 by welding 510.

Figure 9:
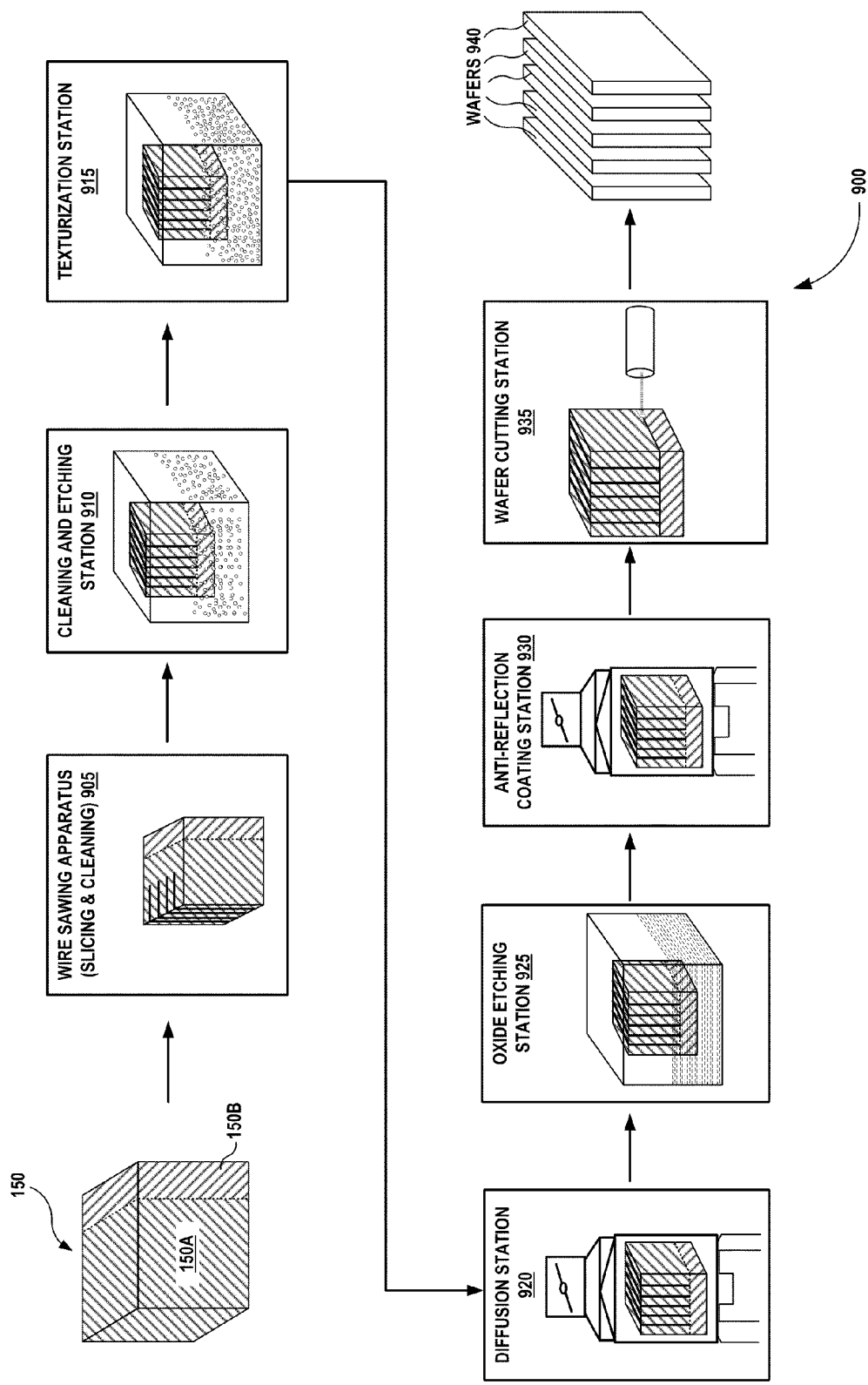
FIG. 9 illustrates an exemplary in-situ wafer processing system, according to an embodiment of the present invention.

It is appreciated that welding of the fully cut work piece 150 to the plate 160 ensures secured holding of sliced wafers to the plate 160 during wafer sawing and processing operations (as shown in FIG. 9). It should be noted that welding affords an advantage in exposing the fully cut work piece 150 and the plate 160 to high temperatures (e.g., 20-1200° C.) of fluids, furnaces or ovens. One skilled in the art can envision that the fully cut work piece 150 can also be attached to the plate 160 using other similar techniques (e.g., using glue, epoxy, etc.) that are well known in the art.

Further, as shown in FIG. 5B, the uncut portion 150B of the partially cut work piece 150 act as the plate for secured holding of sliced wafers during wafer sawing and processing operations. Thus, the need for attaching the plate 160 to the partially cut work pieces 150A by welding, epoxy, or glue is eliminated. The work pieces 150 shown in FIGS. 5A and 5B are then loaded on the wire sawing apparatus for slicing of wafers, which is described in greater detail with respect to FIGS. 6 and 7.

FIG. 6 illustrates an exemplary horizontal ingot feeding wire slicing and cleaning apparatus 600 and a method thereof, according to an embodiment of the present invention. As shown in FIG. 6, the horizontal ingot feeding wire slicing and cleaning apparatus 600 includes a vertical wire web 140, a first top outlet 610, a second top outlet 650, a first chute 630 and a second chute 670.

It can be seen in FIG. 6 that, sawing wires of the vertical wire web 140 are located in a vertical plane and move in a substantially vertical direction. In some embodiments, the sawing wires of the vertical wire web 140 are formed by spirally winding between two wire guides cylinders 130. In these embodiments, the sawing wires are stretched between the two wire guide cylinders 130 and held substantially in the vertical plane by a defining interval between the sawing wires.

As shown in FIG. 6, the partially cut work piece 150, including a portion to be sliced 150A and an uncut portion 150B which acts as the plate, is loaded on to the horizontal ingot feeding wire slicing and cleaning apparatus 600 for slicing wafers. As shown in FIG. 6, a support table 220 of the horizontal ingot feeding wire slicing and cleaning apparatus 600 carries the partially cut work piece 150. In an alternate embodiment, the fully cut work piece 150 attached to the plate 160 (as shown in FIG. 5A) is loaded on to the horizontal ingot feeding wire slicing and cleaning apparatus 600 for slicing wafers.

In operation, the partially cut work piece 150 is impelled against the vertical wire web 140 by movement in a horizontal direction (e.g., as shown by reference numeral 640) for slicing wafers. It is appreciated that the sawing wires of the vertical wire web 140 are adapted to move in a substantially vertical alternating or continuous direction while impelled against the partially cut work piece 150.

Further, in accordance with the above-described embodiments, the first top outlet 610 and the second top outlet 650 are located in a top position with respect to the partially cut work piece 150 for applying fluid 620 and a cleaning fluid 660 respectively, during the sawing operation. In one exemplary implementation, the first top outlet 610 is located and oriented to substantially flow the fluid 620 over the top of the partially cut work piece 150 as the partially cut work piece 150 is impelled against the vertical wire web 140 and during the slicing of the wafers. For example, the fluid 620 is an abrasive slurry.

Further, as shown in FIG. 6, the first chute 630 is located substantially below the partially cut work piece 150 for removing the fluid 620. In one exemplary implementation, the fluid 620 is applied using the first chute 630 to the top of the partially cut work piece 150 and the applied fluid 620 flows in a vertical direction against and into the partially cut work piece 150 for slicing the wafers, which is finally received by the first chute 630.

Further, the second top outlet 650 is located and oriented to substantially spray the cleaning fluid 660 over wafers as cut wafers emerge from the vertical wire web 140. In some embodiments, the cleaning fluid 660 includes a surfactant such that the wafers in the vertical wire web 140 are maintained in a separate condition by electrostatic repulsion. In these embodiments, the cleaning fluid 660 also includes water. As shown in FIG. 6, the second chute 670 is located substantially below the partially cut work piece 150 for removing the cleaning fluid 660 after the cleaning fluid 660 flows between the cut wafers and cleans the cut wafers emerging from the vertical wire web 140.

According to the one or more embodiments described above, the method for producing wafers using the above-described horizontal ingot feeding wire slicing and cleaning apparatus 600 includes cutting the partially cut work piece 150 that includes one or more ingots by impelling the partially cut work piece 150 substantially into the vertical wire web 140 and contacting the moving the partially cut work piece 150 for slicing thin wafers separately with the fluid 620 (e.g., an abrasive slurry) and the cleaning fluid 660. The cleaning fluid 660 cleans wafers of the resulting wafer stack during the impelling process. Further, moving and contacting the partially cut work piece 150 with the fluid 620 and the cleaning fluid 660 slice the wafers secured at one end to the plate 150B. In addition, the method includes dissipating heat during cleaning by adjusting slicing rate and thermal properties of the abrasive slurry 620 and the cleaning fluid 660.

FIG. 7 illustrates the exemplary horizontal ingot feeding wire slicing and cleaning apparatus 600 shown in FIG. 6, wherein the sliced and cleaned wafers are removed after the sawing operation, according to an embodiment of the present invention. The sawing operation is complete when the partially cut work piece 150 passes through a predetermined depth equal to the wafer width and the cut wafers are simultaneously cleaned using the cleaning fluid 660. As shown in FIG. 7, the sliced wafers secured to the plate 150B are slowly pulled out (indicated by a reference numeral 710) of the vertical wire web 140 and then taken for performing the downstream processes.

Figure 8A:
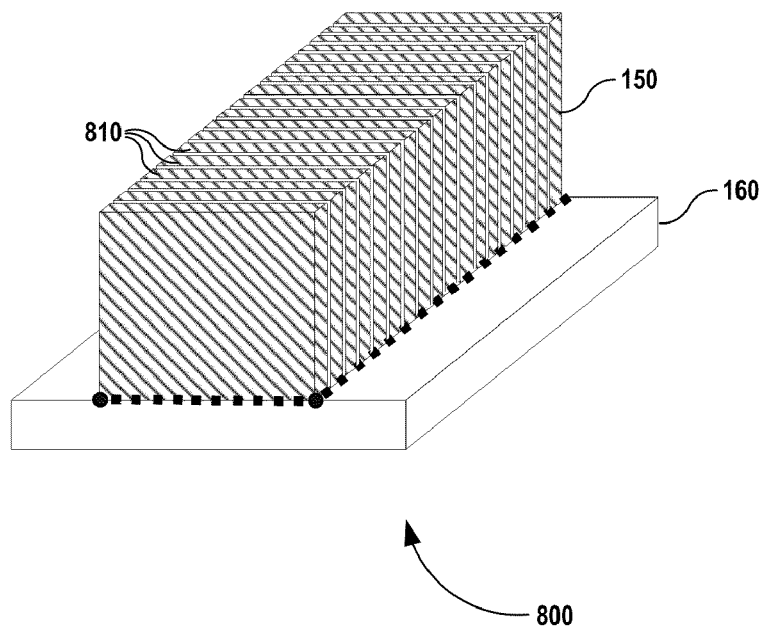
FIGS. 8A and 8B illustrate wafer stacks of sliced wafers obtained after the slicing process, such as those shown in FIGS. 6 and 7, according to an embodiment of the present invention.
Figure 8B:
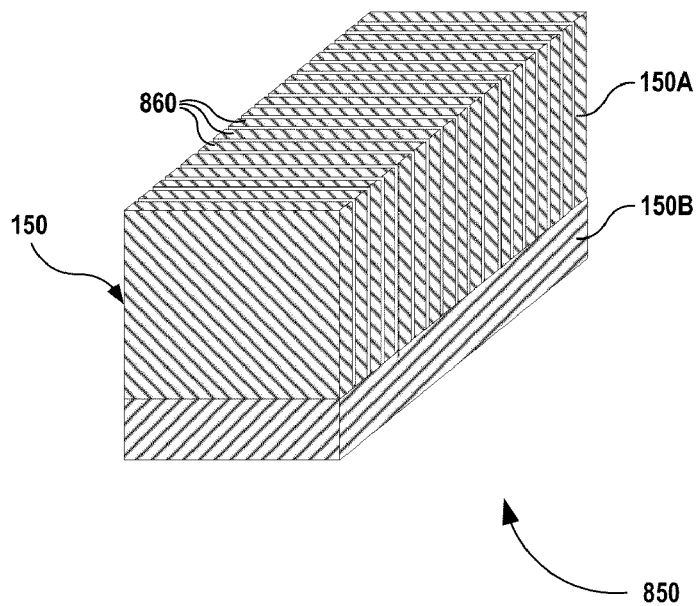

FIGS. 8A and 8B illustrate wafer stacks of sliced wafers 800 and 850 obtained after the slicing process, such as those shown in FIGS. 6 and 7, according to an embodiment of the present invention. Particularly, FIGS. 8A and 8B illustrate wafer stacks of sliced wafers 800 and 850 including a plurality of sliced wafers, where the plurality of sliced wafers extend outwardly from a base which is the plate 160 and the uncut portion 150B respectively.

In the example embodiment illustrated in FIG. 8A, the plurality of sliced wafers is obtained by slicing the fully cut work piece 150. Alternatively, in the example embodiment illustrated in FIG. 8B, the plurality of sliced wafers is obtained by slicing a portion of the partially cut work piece 150A. Further, as illustrated in FIGS. 8A and 8B, the sliced wafers are square in shape. One can envision that the shape of the sliced wafers can also be rectangular, circular or polygon.

As illustrated in FIGS. 8A and 8B, the sliced wafers of the wafer stacks 800 and 850 are separated from each other by sawing gaps 820 and 860 respectively due to the defining interval between the sawing wires of the wire sawing apparatus. The thickness of each resulting wafer of the wafer stack is less than about 800 microns, less than about 500 microns, less than about 300 microns, less than about 200 microns, less than about 150 microns, less than about 100 microns, or less than about 50 microns. Further, the wafer stacks of the sliced wafers 800 and 850 are taken for downstream processing, which is described in greater detail in FIG. 9. It is appreciated that the sliced wafers need not be carried individually (e.g., in plastic or ceramic carriers) for performing the downstream processes. This reduces labor, breakages, time, etc. associated with the downstream processing of the sliced wafers of the wafer stack.

FIG. 9 illustrates an exemplary in-situ wafer processing system 900, according to an embodiment of the present invention. As shown in FIG. 9, the in-situ wafer processing system 900 includes a wire sawing apparatus 905, a cleaning and etching station 910, a texturization station 915, a diffusion station 920, an oxide etching station 925, an anti-reflection coating station 930 and a wafer cutting station 935. In one embodiment, the wire sawing apparatus 905 includes a wire web and at least one outlet for applying fluid to the work pieces 150 (e.g., as illustrated in FIGS. 5A and 5B) during sawing, where the fluid flows into the work piece 150 for slicing and resulting in a wafer stack of sliced wafers.

Figure 2:
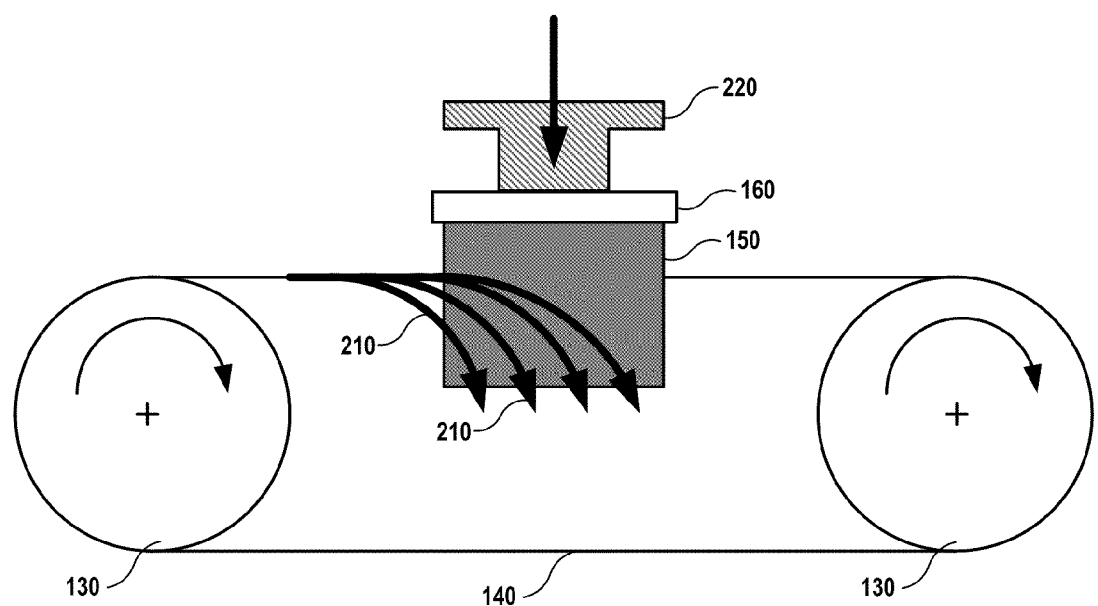
FIG. 2 illustrates schematics of the slurry flow in the conventional wire saw, such as those shown in FIG. 1, through the wafers during cutting.

In one exemplary implementation, the wire web is a substantially vertical wire web located substantially in a vertical plane and move in a substantially vertical direction (e.g., as shown in FIGS. 6 and 7). In another exemplary implementation, the wire web is a substantially horizontal wire web located in a substantially horizontal plane and move in a substantially horizontal direction (e.g., as shown in FIGS. 1 and 2). It is appreciated that the wafers of the resulting wafer stack are cleaned as the cut wafers emerge from the wire sawing apparatus 905 by contacting with a cleaning fluid.

In accordance with above-described embodiments, the cleaning and etching station 910 includes means for damage etching of the wafers in-situ in the wafer stack after the slicing is substantially complete. In one embodiment, damage etching of the wafers of the wafer stack can be performed while the wafers are in the wire sawing apparatus 905. For example, damage etching is performed using etchants, such as hot potassium hydroxide (KOH) or sodium hydroxide (NaOH) solution. In one embodiment, the cleaning and etching station 910 removes damaged layer on the wafers of the wafer stack, generated during the sawing process. Further, the texturization station 915 includes means for texturization of the wafers in the wafer stack after damage etching is substantially complete. For example, texturization is performed using chemical solutions such as potassium hydroxide (KOH), hydrofluoric acid (HF) and nitric acid (HNO$_3$), and the like. It can be also seen in FIG. 9 that, the diffusion station 920 and the anti-reflection station 930 includes means (e.g., dryers and furnaces) for treating the wafers in the wafer stack with heat processes.

The diffusion station 920 performs diffusion (e.g., n-diffusion) with phosphorous. In one exemplary implementation, the oxide etching station 925 includes means for oxide etching of the wafers in the wafer stack to etch oxide layer generated during the process of diffusion. Further, the anti-reflection coating station 930 applies anti-reflection coating on the wafers in the wafer stack. Furthermore, the wafer cutting station 935 includes means for cutting wafers from the wafer stack. For example, the wafers are cut using a saw or using tools such as diamond blades, diamond coated wire or lasers (e.g., ytterbium lasers, diode-pumped solid-state lasers, fiber laser, etc.).

In operation, fully cut or partially cut work piece 150 is loaded into the wire sawing apparatus 905 for slicing and cleaning of thin wafers. Further, the work piece 150 is cut by impelling and moving the work piece 150 into the wire web. The moving work piece 150 is contacted separately with two fluids including an abrasive slurry and a cleaning fluid for slicing and cleaning thin wafers respectively secured at one end of the plate 150B. It can be seen in FIG. 9 that, the plate 150B is an uncut portion of the partially cut work piece 150. It is appreciated that during cleaning, heat is dissipated by adjusting slicing rate and thermal properties of the abrasive slurry and the cleaning fluid.

Further, the wafers of the wafer stack are moved to the cleaning and etching station 910 for performing damage etching of the wafers. Then, the process of texturization is performed on the wafers in the texturization station 920. After performing damage etching and texturization on the wafers in the wafer stack, the wafers are rinsed with water and dried. The dry wafers are then treated with heat processes such as diffusion in the diffusion station 920 and anti-reflection coating in the anti-reflection coating station 930. In addition, after diffusion, the wafers are oxide etched in the oxide etching station 925 to remove the oxide layer formed during the process of diffusion, as shown in FIG. 9.

It is appreciated that the wafers remain attached to the plate 150B which is an uncut portion of the partially cut work piece 150 while the wafers are being processed. It can be seen that the above technique results in an in-situ process as the wafers, produced during the slicing process and held as a stack either by the welded plate 160 (e.g., as shown in FIG. 8A) or by the uncut portion 150B (e.g., as shown in FIG. 8B), move through the downstream process (e.g., associated with the solar cell manufacturing) without having to be separated from the wafer stack and to be carried by plastic or ceramic carriers, thus reducing handling and breakage.

Finally, the wafer stack is moved into the wafer cutting station 935 where the wafers are cut from the wafer stack to produce wafers 940 (e.g., mono-crystalline or multi-crystalline). Moreover, the resulting thin wafers are used for cells for photovoltaic applications.

The above-described in-situ wafer processing system ensures reduced labor, breakages, time during processing of the sliced wafers as the cut wafers are held securely to the plate or the uncut portion of the work piece that act as the plate. Thus, the sliced wafers need not be processed individually instead they are processed as a wafer stack, which are later cut from the wafer stack.

Although, the above description is made with reference to mono-crystalline and multi-crystalline solar cell manufacturing, one can envision that the work piece may include other materials such as silicon for microelectronics, sapphire, gallium arsenide (GaAs), indium phosphide (InP), silicon carbide (SiC), lithium tantalate (LiTaO$_3$) Z-cut crystals, lithium niobate (LiNbO$_3$), lithium triborate (LiB$_3$O$_5$), quartz crystals, ceramics like aluminum nitride (ALN) and lead zirconate titanate (PZT), magnetic materials/parts, optical parts, or glass.

A skilled person will recognize that many suitable designs of the systems and processes may be substituted for or used in addition to the configurations described above. It should be understood that the implementation of other variations and modifications of the embodiments of the invention and its various aspects will be apparent to one ordinarily skilled in the art, and that the invention is not limited by the exemplary embodiments described herein and in the claims. Therefore, it is contemplated to cover the present embodiments of the invention and any and all modifications, variations, or equivalents that fall within the true spirit and scope of the basic underlying principles disclosed and claimed herein. The contents of all references cited are incorporated herein by reference in their entireties.

What is claimed is:

1. An integrated wafer processing system, comprising:
    a wire sawing apparatus, wherein the wire sawing apparatus comprises:
        a wire web, wherein at least one work piece is impelled against the wire web; and
        at least one first top outlet and at least one second top outlet for applying fluids during sawing, wherein the fluids comprise an abrasive slurry and at least one cleaning fluid, wherein the at least one first top outlet being located in a top position with respect to the at least one work piece, wherein the fluids flow in a substantially downward vertical direction under a gravitational force and wherein the at least one first top outlet supplies the abrasive slurry to the at least one work piece and the abrasive slurry flows into the at least one work piece for slicing and resulting in wafer stack of cut wafers held integrally by an uncut portion or by a welded plate and the at least one second top outlet supplies the at least one cleaning fluid, wherein the at least one second top outlet being located and oriented to substantially spray the at least one cleaning fluid over the wafers for cleaning as the cut wafers emerge from the wire web.

2. The system according to claim 1, wherein the wire web is a substantially vertical wire web located substantially in a vertical plane and move in a substantially vertical direction or a substantially horizontal wire web located in a substantially horizontal plane and move in a substantially horizontal direction.

3. The system according to claim 2, wherein the wire sawing apparatus is further configured to include:
    at least one chute for removing the fluids, wherein the at least one chute is located substantially below the at least one work piece for receiving the fluids, wherein the at least one work piece is impelled against the vertical wire web by movement in a horizontal direction, and wherein the fluids are applied to the top of the at least one work piece and the fluids flow in a vertical direction against and into the at least one work piece for slicing and cleaning wafers and resulting in the wafer stack of cut wafers.

4. The system according to claim 3, wherein the at least one first top outlet is located and oriented to substantially flow the abrasive slurry over the top of the at least one work piece as the work piece is impelled against the vertical wire web and during slicing of the wafers.

5. The system according to claim 3, wherein during the horizontal movement of the at least one work piece against the vertical wire web, the sliced and cleaned wafers are secured to the welded plate, and wherein the welded plate comprises glass, silicon, ceramic, or plastic material.

6. The system according to claim 3, wherein the at least one work piece is attached to the plate by welding.

7. The system according to claim 3, wherein the plate is an uncut portion of the work piece.

8. The system according to claim 3, wherein the at least one work piece comprises silicon (Si), sapphire, gallium arsenide (GaAs), indium phosphide (InP), silicon carbide (SiC), lithium tantalate (LiTaO$_3$) Z-cut crystals, lithium niobate (LiNbO$_3$), lithium triborate (LiB$_3$O$_5$), quartz crystals, ceramics like aluminum nitride (ALN) and lead zirconate titanate (PZT), magnetic materials/parts, optical parts or glass.

9. The system according to claim 8, wherein the silicon is selected from the group consisting of mono-crystalline and multi-crystalline.

10. The system according to claim 1, further comprising means for damage etching of the wafers in the wafer stack, after slicing is substantially complete or while the wafers are in the wire sawing apparatus.

11. The system according to claim 10, further comprising means for texturization of the wafers in the wafer stack, after damage etching is substantially complete.

12. The system according to claim 11, further comprising means for treating of the wafers in the wafer stack with heat processes such as diffusion and anti-reflection coating and wherein the wafers remain attached to the plate or the plate is an uncut portion of the work piece.

13. The system according to claim 12, further comprising a means for oxide etching of the wafers in the wafer stack, after the diffusion is substantially complete.

14. The system according to claim 12, wherein the wafers are cut from the wafer stack by a saw or tool selected from the group consisting of diamond blades, diamond coated wire, and lasers.

15. An integrated wafer processing system, comprising:
    a wire sawing apparatus, wherein the wire sawing apparatus comprises:
        a wire web, wherein the wire web is a substantially vertical wire web located substantially in a vertical plane and move in a substantially vertical direction, and wherein at least one work piece is impelled against the vertical wire web; and
        at least one first top outlet and at least one second top outlet for applying fluids during sawing, wherein the fluids comprise an abrasive slurry and at least one cleaning fluid, wherein the at least one first top outlet being located in a top position with respect to the at least one work piece, wherein the fluids flow in a substantially downward vertical direction under a gravitational force, wherein the at least one first top outlet supplies the abrasive slurry to the at least one work piece and the abrasive slurry flows into the at least one work piece for slicing and resulting in wafer stack of cut wafers held integrally by an uncut portion or by a welded plate and the at least one second top outlet supplies the at least one cleaning fluid, wherein the at least one second top outlet being located in a top position of the cut wafers to provide the at least one cleaning fluid for cleaning the cut wafers, and wherein the at least one second top outlet is located and oriented to substantially spray the at least one cleaning fluid over the wafers as the cut wafers emerge from the vertical wire web.

16. The system according to claim 15, wherein the wire sawing apparatus further comprises:
    at least one chute for removing the fluids, wherein the at least one chute is located substantially below the at least one work piece for receiving the fluids, wherein the at least one work piece is impelled against the vertical wire web by movement in a horizontal direction, and wherein the fluids are applied to the top of the at least one work piece and the fluids flow in a vertical direction against and into the at least one work piece for slicing and cleaning wafers and resulting in the wafer stack of cut wafers.

17. An integrated wafer processing system, comprising:
a wire sawing apparatus, wherein the wire sawing apparatus comprises:
   a wire web, wherein the wire web is a substantially vertical wire web located substantially in a vertical plane and move in a substantially vertical direction, and wherein at least one work piece is impelled against the vertical wire web; and
   at least one first top outlet and at least one second top outlet for applying fluids during sawing, wherein the fluids comprise an abrasive slurry and at least one cleaning fluid, wherein the at least one first top outlet being located in a top position with respect to the at least one work piece, wherein the fluids flow in a substantially downward vertical direction under a gravitational force and wherein the at least one first top outlet supplies the abrasive slurry to the at least one work piece and the abrasive slurry flows into the at least one work piece for slicing and resulting in wafer stack of cut wafers held integrally by an uncut portion or by a welded plate and the at least one second top outlet supplies the at least one cleaning fluid, wherein the at least one second top outlet being located in a top position of the cut wafers to provide the at least one cleaning fluid for cleaning the cut wafers; and
   at least one chute for removing the fluids, wherein the at least one chute is located substantially below the at least one work piece for receiving the fluids, wherein the fluids are applied to the top of the at least one work piece and the fluids flow in a vertical direction against and into the at least one work piece for slicing and cleaning wafers and resulting in the wafer stack of cut wafers, and wherein the at least one chute is a first chute and a second chute for separately removing each of the abrasive slurry and the at least one cleaning fluid.

18. An integrated wafer processing system, comprising:
a wire sawing apparatus, wherein the wire sawing apparatus comprises:
   a wire web, wherein the wire web is a substantially vertical wire web located substantially in a vertical plane and move in a substantially vertical direction, and wherein at least one work piece is impelled against the vertical wire web; and
   at least one first top outlet and at least one second top outlet for applying fluids during sawing, wherein the fluids comprise an abrasive slurry and at least one cleaning fluid, wherein the at least one first top outlet being located in a top position with respect to the at least one work piece, wherein the fluids flow in a substantially downward vertical direction under a gravitational force, wherein the at least one first top outlet supplies the abrasive slurry to the at least one work piece and the abrasive slurry flows into the at least one work piece for slicing and resulting in wafer stack of cut wafers held integrally by an uncut portion or by a welded plate and the at least one second top outlet supplies the at least one cleaning fluid, wherein the at least one second top outlet being located in a top position of the cut wafers to provide the at least one cleaning fluid for cleaning the cut wafers, and wherein the at least one cleaning fluid comprises at least one surfactant, wherein the wafers in the vertical wire web are maintained in a separate condition by electrostatic repulsion.

19. The system accordingly to claim 18, wherein the at least one cleaning fluid further comprises water.

20. The system according to claim 18, wherein the wire sawing apparatus further comprises:
   at least one chute for removing the fluids, wherein the at least one chute is located substantially below the at least one work piece for receiving the fluids, wherein the at least one work piece is impelled against the vertical wire web by movement in a horizontal direction, and wherein the fluids are applied to the top of the at least one work piece and the fluids flow in a vertical direction against and into the at least one work piece for slicing and cleaning wafers and resulting in the wafer stack of cut wafers.

21. A method for producing wafers, the method comprising:
   cutting a work piece comprising at least one ingot by impelling the work piece into a wire web, and wherein the work piece is moved into the wire web; and
   contacting the moving work piece for slicing and cleaning thin wafers separately with at least two fluids comprising an abrasive slurry and a cleaning fluid resulting in a thin wafer stack, wherein the at least two fluids flow in a substantially downward vertical direction under at least a gravitational force, wherein moving the work piece and contacting with the abrasive slurry results in slicing the thin wafers secured at one end to a plate, wherein the cleaning fluid cleans the thin wafers of the resulting wafer stack during the impelling process.

22. The method according to claim 21, further comprising:
during cleaning, dissipating heat by adjusting slicing rate and thermal properties of the abrasive slurry and the cleaning fluid.

23. The method according to claim 21, further comprising:
during or after cleaning, performing in-situ at least one of damage etching, texturizing, diffusion, oxide etching, and/or applying anti-reflection coating to the thin wafers of the wafer stack.

24. The method according to claim 21, wherein thickness of each sliced wafer is less than about 800 microns, less than about 500 microns, less than about 300 microns, less than about 200 microns, less than about 150 microns, less than about 100 microns, or less than about 50 microns.

25. The method according to claim 21, wherein the plate comprises glass, ceramic, plastic, or silicon material.

26. The method of according to claim 21, wherein the plate is attached to the work piece by glue, epoxy or welding.

27. The method according to claim 21, wherein the plate is an uncut portion of the work piece.

28. The method according to claim 21, wherein the work piece comprises silicon (Si), sapphire, gallium arsenide (GaAs), indium phosphide (InP), silicon carbide (SiC), lithium tantalate ($LiTaO_3$) Z-cut crystals, lithium niobate ($LiNbO_3$), lithium triborate ($LiB_3O_5$), quartz crystals, ceramics like aluminum nitride (ALN) and lead zirconate titanate (PZT), magnetic materials/parts, optical parts or glass.

29. The method according to claim 28, wherein the silicon is selected from the group consisting of mono-crystalline and multi-crystalline.

30. The method according to claim 21, wherein, in cutting the work piece comprising at least one ingot by impelling the work piece into the wire web, the wire web is a substantially vertical wire web located substantially in a vertical plane and move in a substantially vertical direction or a substantially horizontal wire web located in a substantially horizontal plane and move in a substantially horizontal direction.

* * * * *